United States Patent [19]

Fabricius et al.

[11] Patent Number: 5,102,781
[45] Date of Patent: Apr. 7, 1992

[54] BLUE SPECTRAL SENSITIZERS FOR NON-TABULAR SILVER HALIDE ELEMENTS

[75] Inventors: Dietrich M. Fabricius; Raymond J. LeStrange, both of Hendersonville, N.C.

[73] Assignee: E. I. du Pont de Nemours and Company, Wilmington, Del.

[21] Appl. No.: 549,819

[22] Filed: Jul. 9, 1990

[51] Int. Cl.$^5$ .................................................. G03C 1/10
[52] U.S. Cl. ..................................... 430/591; 430/570
[58] Field of Search ................................ 430/591, 570

[56] References Cited

U.S. PATENT DOCUMENTS 4,105,454  8/1978  Tani ...................................... 430/591

Primary Examiner—Charles L. Bowers, Jr.
Assistant Examiner—Janet C. Baxter

[57] ABSTRACT

Zeromethine blue spectral sensitizing dyes have found utility in emulsions made without tabular grains. These emulsions are particularly useful for exposure to a light source rich in blue emission and are especially useful in radiographic elements designed for exposure to intensifying screens having such emission.

5 Claims, No Drawings

BLUE SPECTRAL SENSITIZERS FOR NON-TABULAR SILVER HALIDE ELEMENTS

BACKGROUND OF THE INVENTION

This invention relates to silver halide emulsions wherein the silver halide is comprised of non-tabular grains. More specifically, this invention relates to spectral sensitizing dyes specifically designed to increase the blue sensitivity of said silver halide elements and the relative emulsion speed thereof. Still more particularly, this invention relates to blue sensitive, gelatino silver halide emulsions that can be used in conjunction with specific X-ray intensifying screens to improve the output therefrom.

The prior art teaches the use of blue sensitizing dyes with tabular grain emulsions since these emulsions are not particularly sensitive in this spectral region. Thus, in tabular silver halide elements designed specifically for use in the field of X-ray, it is conventional to add some sort of blue sensitizing dye to this emulsion to increase the sensitivity within this region. Although in the past, blue sensitizing dyes have been added to emulsions made using regular, spherical-type silver halide grains, for example, these dyes have usually been added for a specific purpose. For example, certain films designed for exposure to laser generated images have a dye sensitive in the blue region of the spectrum (e.g. from about 450 nm to about 490 nm), added thereto. However, it is generally not conventional to add sensitizing dyes to standard emulsions since they already possess considerable sensitivity in the blue region and there would be no particular advantage for this addition. However, with the increasing presence of alternative light sources emitting energy in this blue region, there is a pressing need to insure that the emulsions have the requisite sensitivity to record images when exposed thereto. This is especially prevalent in the area of X-ray since there are now higher speed phosphors which have recently been discovered. Thus, there is a need to have silver halide elements which are sensitive to the light output of these phosphors.

SUMMARY OF THE INVENTION

It is an object of this invention to prepare a highly sensitive, spherical grain emulsion having at least one, blue spectral sensitizing dye incorporated therein. It is also an object of this invention to prepare silver halide elements that are particularly sensitive to light emitted in the blue region of the spectrum. These and yet other objects are achieved with a photographic element comprising a support and at least one, non-tabular silver halide emulsion layer coated thereon, the improvement comprising adding at least one blue spectral sensitizing dye of the following structure:

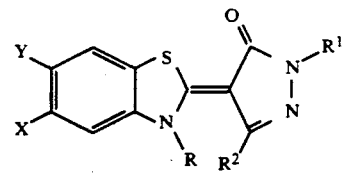

wherein
X and Y independently of the other are halogen, —O—CH$_3$, carboxy or H;
R is alkyl, alkylcarboxy, sulfopropyl, or sulfobutyl;
R$^1$ is phenyl, H, sulfophenyl, carboxyphenyl, a substituted aromatic or alkyl; and
R$^2$ is carboxy or alkyl, wherein each alkyl independently of the other contains 1–5 carbon atoms.

DETAILS OF THE INVENTION

The silver halide emulsions of this invention may contain any of the common halide constituents such as bromide, iodide or chloride or mixtures of 2 or more thereof. Generally, these emulsions are mostly bromide containing small amounts (e.g. 1–10 mol percent) of iodide therein. The grains are non-tabular grains and thus have spherical or cubic shapes. These grains are usually generated by precipitation in a small amount gelatin. Then, these grains are dispersed in a larger, bulking amount of gelatin and are generally sensitized with gold and sulfur as is well-known to those skilled in the art. It is conventional to digest the emulsion at an elevated temperature in order to insure that the sensitization step is complete. Other ingredients and salts may also be added as well as the usual wetting agents, antifoggants, coating aids, antistatic agents and the like. The dyes of this invention are usually added after any chemical sensitization and the emulsion digested for a period of time to insure that the dye is firmly adhered thereto.

The blue, spectral sensitizing dye of this invention has the following, broad, generic structure:

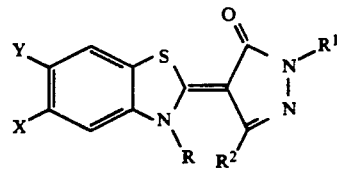

wherein
X and Y independently of the other are halogen, —O—CH$_3$, carboxy or H;
R is alkyl, alkylcarboxy, sulfopropyl, or sulfobutyl;
R$^1$ is phenyl, H, sulfophenyl, carboxyphenyl, a substituted aromatic or alkyl; and
R$^2$ is carboxy or alkyl, wherein each alkyl independently of the other contains 1–5 carbon atoms.
Within the ambit of this disclosure, the following structures have been synthesized:

TABLE 1

| Dye No. | X | Y | R | R$_1$ | R$_2$ | λmax | ($\epsilon \times 10^{-4}$) | mp (°C.) |
|---|---|---|---|---|---|---|---|---|
| 1 | H | H | (CH$_2$)$_3$SO$_3$—K$^+$ | H | CH$_3$ | 383 | (1.3) | 170–280 |
| 2 | H | H | (CH$_2$)$_3$SO$_3$—K$^+$ | PH | CH$_3$ | 380 | (1.8) | 190–196 |
| 3 | Cl | H | (CH$_2$)$_3$SO$_3$—K$^+$ | PH | CH$_3$ | 383 | (1.9) | 271–276 |
| 4 | H | H | CH$_3$ | PH | CH$_3$ | 375 | (2.5) | 159–162 |
| 5 | MeO | H | CH$_3$ | PH | CH$_3$ | 386 | (2.5) | 155–156 |
| 6 | Cl | H | CH$_3$ | PH | CH$_3$ | 379 | (2.6) | 206 |
| 7 | H | H | CH$_2$CH$_3$ | PH | CH$_3$ | 379 | (2.5) | 144–148 |

TABLE 1-continued

| Dye No. | X | Y | R | $R_1$ | $R_2$ | λmax | ($\epsilon \times 10^{-4}$) | mp (°C.) |
|---|---|---|---|---|---|---|---|---|
| 8 | Cl | H | CH$_2$CH$_3$ | PH | CH$_3$ | 382 | (2.1) | 161–162 |

These dyes, among others covered by the generic structure, may be advantageously added to a non-tabular, silver halide emulsion and will generally increase the sensitivity thereof. Particularly useful emulsions are the negative-working, developing out, silver bromoiodide emulsions used for X-ray, for example. These emulsions generally are about 97 mol percent bromide and about 3 mol percent iodide and are double side coated on standard film base supports well-known in the art (e.g. polyethylene terephthalate film, for example). These films may contain a small amount of a blue tint in order to enhance the image generated thereon, in fact it is so preferred.

X-ray film elements made in this manner are useful for exposure with many of the well-known, conventional intensifying screen structures such as those made from phosphors including calcium tungstate; gadolinium oxysulfide; the yttrium tantalates; among many others. Most of these screens absorb energy when x-radiation is impinged thereon and then emit visible light in response thereto. It is this visible light that is used to expose the X-ray film elements associated therewith. Some of the newer, high efficiency phosphors have major emission peaks in the blue region of the spectrum. Thus, it is important to have a film which is particularly sensitive to this blue region. Dye sensitization usually causes some reduction in emulsion speed. In the case of the instant invention, this is not so. These elements, sensitized with the novel dyes described herein, still maintain a high degree of emulsion sensitivity without loss of other characteristics such as increased fog, lower contrast, and the like.

DYE MAKING PROCEDURES

The following procedures were used to make the dyes described in the above Table:

Dye 1:

2-Methylthio-3-(3'-sulfopropyl)benzothiazolium, inner salt

2-Methylthiobenzothiazole (18.1 g, 0.1 mol) was melted and mixed with 8.8 ml melted 1,3-propanesultone. The mixture was heated, dissolved at 58° C., precipitating at 103° C., and exotherming at 137° C. The temperature rose to 168° C., then allowed to cool to 117° C. when the heat was removed. After cooling the solid was broken up, triturated with acetone and methanol, filtered, and washed with acetone until colorless. Yield was 24.55 g (81%) of off-white crystals, mp 223–235° C.

4-[3(3'-sulfopropyl)benzothiazolinylidene]-3-methyl-1-phenylpyrazolin-5-one potassium salt 3-Methylpyrazolin-5-one (0.98 g, 0.01 mol) was mixed with 3.03 g (0.01 mol) 2-methylthio-3-(3'-sulfopropyl)benzothiazolium, inner salt in 100 ml 95% ethanol. Triethylamine (1.01 g 0.01 mol) was added. The mixture was stirred for one day, the solvent evaporated, and the residue dissolved in isopropanol. The resulting solution was treated with 1 g KOAc in methanol to precipitate the dye. Filtering and acetone washing yielded 3.65 g (93%), mp 170°–280° C., λmax=383 ($\epsilon$=13,000).

Dye 2:

4-[3-(3'-sulfopropyl)benzothiazolinylidene]-3-methyl-1-phenylyrazolin-5-one potassium salt 3-Methyl-1-phenylpyrazolin-5 one (8.71 g, 0.05 mol) was mixed with 15.15 g (0.05 mol) 2-methylthio-3-(3'-sulfopropyl)benzothiazolium, inner salt in 500 ml 95% ethanol. Triethylamine (5.05 g, 0.05 mol) was added. The mixture was stirred for two hours, the solvent evaporated, and the residue dissolved in isopropanol. The resulting solution was treated with 5 g KOAc in 30 ml methanol to precipitate the dye. Filtering and acetone washing yielded 16.43 g (70%), mp 190°–196.5° C., λmax=380 ($\epsilon$=18,000).

Dye 3:

5-Chloro-2-(methylthio)benzothiazole

5-Chloro-2-mercaptobenzothiazole (10.16 g 0.05 mol) in 25 ml 95% ethanol was treated with 5.09 g (0.05 mol) triethylamine to give a yellow solution. Addition of iodomethane (7.18 g, 0.05 mol) exothermed the reaction to 60° C. Additional heat refluxed the reaction of 2.5 hours. Cooling yielded copious crystals, which were filtered and alcohol washed to yield 7.68 g (71%), mp 70°–72° C.

5-Chloro-2-methylthio-3-(3'-sulfopropyl)benzothiazolium, inner salt

5-Chloro-2-methylthiobenzothiazole (3.21 g, 0.149 mol) was heated with 1.34 ml liquid 1,3-propanesultone at 125°–133° C. for three hours. After cooling to 50° C., acetone was added to soften the cake. The solid was triturated with acetone, filtered, and washed with acetone until colorless. Yield was 3.86 g (77%), mp 235°–236° C.

4-[5-chloro-3-(3'-sulfopropyl)benzothiazolinylidene]-3-methyl-1-phenylpyrazolin-5-one, potassium salt 3-Methyl-1-phenylpyrazolin-5-one (1.045 g) was mixed with 2.03 g (0.006 mol) 2-methylthio-5-chloro-3-(3'-sulfopropyl)benzothiazolium, inner salt in 50 ml methanol. Triethylamine (0.62 g) was added. The mixture was stirred for one hour, the solvent evaporated, and the residue dissolved in isopropanol. The resulting solution was treated with 0.6 g KOAc in methanol to precipitate the dye. Filtering yielded 2.17 g (72%), mp 271°–276° C., λmax=383 ($\epsilon$=19,000).

Dye 4:

3-Methyl-2-methylthio)benzothiazole p-toluene-sulfonate 2-(methylthio)benzothiazole (543.1 g, 3.0 mol) was melted, placed in an 5000 ml 3-neck flask with mechanical stirrer, and mixed with 558.0 g (3.0 mol) melted methyl p-toluenesulfonate and 1800 ml xylenes. The mixture was heated to reflux for seven hours when the reflux temperature had dropped from 145° C. to 139° C. The reaction is allowed to cool to room temperature before filtering the mixture. The filter cake is washed with acetone until the washings are colorless. The product is removed from the filter, stirred with 2000 ml acetone for at least 1 hr., filtered, washed with acetone, and vacuum- or air-dried to give 874.1 g (79%), mp 173°–174° C.

4-[-3-methylbenzothiazolinylidene]-3-methyl-1-phenylpyrazolin-5-one

3-Methyl-1-phenylpyrazolin-5-one (1.74 g, 0.01 mol) was mixed with 3.68 g (0.01 mol) 2-methylthio-3- methylbenzothiazolium tosylate in 25 ml methanol. Triethylamine (1.01 g, 0.01 mol) was added. The mixture was stirred for one hour, then filtered and washed with methanol. After drying the yield was 2.46 g (78%), mp 159°–162° C., λmax=375 (ε=25,000).

Dye 5:

5-Methoxy-2-(methylthio)benzothiazole

5-Methoxy-2-mercaptobenzothiazole (18.3 g, 0.1 mol) was dispersed in 125 ml 95% ethanol. Addition of 10.1 g (0.1 mol) triethylamine gave a brown solution. Addition of iodomethane (14.2 g, 0.1 mol) was slightly exothermic. Additional heating brought the mixture to reflux for 2 hours. After cooling, the residue was dispersed in isopropanol and filtered to remove triethylammonium iodide. The filtrate was mixed with water and the layers separated. The aqueous phase was extracted 3×50 ml methylene chloride. The organic portions were combined, washed and brine, and dried with Na$_2$SO$_4$. Filtration and rotary evaporation yielded 21.85 g brown liquid which was distilled at 158°–162° C. (0.125 mm) to give 16.73 g (85%).

5-Methoxy-2-methylthio-3-methylbenzothiazolium tosylate

5-Methoxy-2-(methylthio)benzothiazole (7 g, 0.033 mol) and methyl p-toluenesulfonate (6.77 g, 0.036 mol) were heated to 128°–163° C. for 22 minutes. The resulting solid, after cooling, was triturated with acetone, filtered, and acetone washed until washings were colorless, yielding 12.13 g (96%).

4-[5-methoxy-3-methylbenzothiazolinylidene]-3-methyl-1-phenylpyrazolin-5-one

3-Methyl-1-phenylpyrazolin-5-one (1.74 g, 0.01 mol) was mixed with 3.97 g (0.01 mol) 5-methoxy-2-methylthio-3-methylbenzothiazolium tosylate in 25 ml methanol. Triethylamine (1.01 g, 0.01 mol) was added. The mixture was stirred for 3.5 hours, then filtered and washed with methanol. After drying the yield was 276 g (79%), mp 155°–156° C., λmax=386 (ε=25,000).

Dye 6:

5-chloro-2-methylthio-3-methylbenzothiazolium tosylate

5-Chloro-2-(Methylthio)benzothiazole (5.0 g, 0.023 mol) and 4.40 g methyl p-toluenesulfonate were heated to 152° C. for 7 minutes. Upon cooling, the mixture solidified and then was triturated with acetone to give 7.82 g (84%), mp 170°–185° C.

4-[-5-chloro-3-methylbenzothiazolinylidene]-3-methyl-1-phenylpyrazolin-5-one

3-Methyl-1-phenylpyrazolin-5-one (1.51 g,) was mixed with 3.5 g (0.0087 mol) 5-chloro-2-methylthio-3-methylbenzothiazolium tosylate in 25 ml methanol. Triethylamine (0.89 g,) was added. The mixture was stirred for 1.5 hours, then filtered and washed with methanol. After drying the yield was 2.75 g (89%), mp 206° C., λmax=379 (ε=26,000).

Dye 7:

2-(Ethylthio)benzothiazole

2-Mercaptobenzothiazole (16.72 g, 0.1 mol) in 52 ml 95% alcohol was reacted with 10.1 g (0.1 mol) triethylamine to give a brown solution. Iodoethane (15.6 g, 0.1 mol) was added and the mixture refluxed 45 minutes. The mixture was cooled and the solvent removed by rotary evaporation. Water (100 ml) was added to the residue and an oil separated. The aqueous phase was extracted 2×50 ml methylene chloride, the combined organic phases washed with 50 ml water, and then dried over Na$_2$SO$_4$. Filtration and rotary evaporation yielded a brown liquid which was distilled at 140°–141.5° C. (0.15 mm) to give 10.87 g (56%) pale yellow liquid.

2-ethylthio-3-ethylbenzothiazolium tosylate 2-(Ethylthio)benzothiazole (1062 g, 0.056 mol) and ethyl p-toluensulfonate (11.15 g, 0.056 mol) were heated at 140°–167° C. for 2 hours. The mixture cooled and was dissolved in acetone. The acetone solution was poured into 400 ml anhydrous ether to yield 18.19 g (83%) of gummy solid.

4-[3-ethylbenzothiazolinylidene]-3-methyl-1-phenylpyrazolin-5-one

3-Methyl-1-phenylpyrazolin-5-one (1.74 g, 0.01 mol) was mixed with a methanol solution of 2-ethylthio-3-ethylbenzothiazolium tosylate. Triethylamine (1.01 g, 0.01 mol) was added. The mixture was stirred for 10 minutes, then concentrated and treated with isopropanol. The mixture was heated to dissolve the product, then water was added to cloud, and the mixture cooled to give crystals: 3.22 g (48%), mp 144°–147.5° C., λmax=379 (ε=25,000).

Dye 8:

5-Chloro-2-(ethylthio)benzothiazole

5-Chloro-2-mercaptobenzothiazole (20.17 g, 0.1 mol) in 55 ml 95% ethanol was treated with 10.1 g (0.1 mol) triethylamine to give a brown solution. Iodoethane (15.6 g, 0.1 mol) was added and the mixture refluxed 67 minutes. The mixture was cooled and poured into 300 ml water to precipitate a solid. The aqueous phase was extracted 3×50 ml methylene chloride. The organic extracts were combined with solid precipitate, washed with water, dried over Na$_2$SO$_4$, filtered, and rotary evaporated to give brown solid. Recrystallization from isopropanol yielded 12.26 g (53%) brown crystals, mp 49°–50° C.

5-chloro-2-ethylthio-3-ethylbenzothiazolium tosylate

5-Chloro-2-(ethylthio)benzothiazole (11.5 g, 0.05 mol) and 10.55 g ethyl p-toluenesulfonate were heated at 150°–160° C. for 2 hours. After cooling, the product was dissolved in acetone and poured into 400 ml stirred anhydrous ether. The resulting precipitated oil crystallized upon scraping with a spatula. The ether was decanted, the solid triturated with ether, and the ether again decanted to yield 11.04 g (51%) after air drying.

4-[-5-chloro-3-ethylbenzothiazolinylidene]-3-methyl-1-phenylpyrazolin-5-one

3-Methyl-1-phenylpyrazolin-5-one (1.74 g, 0.01) was mixed with 4.3 g (0.01 mol) 5-chloro-2-ethylthio-3-ethylbenzothiazolium tosylate in 15 ml methanol. Triethylamine (1.01 g, 0.01 mol) was added. The mixture was stirred for 1 hour, then filtered and washed with methanol. After drying the yield was 2.20 g (59%), mp 161°–162.5° C., λmax=382 (ε=21,000).

These dyes may be added dissolved in a suitable solved in the range of 50 mg to 800 mg per 1.5 moles of silver halide present in said emulsion.

This invention will now be illustrated by the following specific examples of which Example 1 is considered to represent the best mode at the time of filing.

EXAMPLES 1–3

A typical, high speed, spherical grain, silver bromoiodide (ca. 2.3 mol percent iodide) X-ray type emulsion was prepared. This emulsion was then dispersed in gelatin and brought to its optimum sensitivity with gold and sulfur as is well-known in the prior art. Samples of this emulsion were taken for testing and in each case, the dye shown below added to the sample between the sulfur chemical sensitization step and the gold sensitization step described above. The dyes dissolved in methanol (e.g. ca 0.25 g dye in 250 ml methanol) were added about 10 minutes prior to the addition of the gold salt and were added at about 200 mg per 1.5 moles of silver halide present in the emulsion. The usual wetting and coating aids along with antifoggants, hardeners, antistatic agents and the like were added after the dye sensitization and while the emulsion was cooling down prior to coating. Each emulsion, along with the control which contained no dye, was coated on a ca. 7 mil dimensionally stable polyethylene film base which had been suitably subbed with a thin layer of resin followed by a thin layer of hardened gelatin. The sub layers are required to permit the coating of aqueous emulsions as is well-known to those of normal skill in the art. After coating, an overcoat layer of hardened gelatin was placed over each emulsion layer to form the film elements of this invention.

Sample strips from each of these coatings were then exposed through a 22 step wedge to an X-ray source while each film was in contact with a standard HI-PLUS X-ray intensifying screen. This screen, made by E. I. Du Pont de Nemours & Co., Wilmington, Del., is manufactured from calcium tungstate phosphor and has a major emission peak at 434 nm. Each film was then developed in standard X-ray chemistry, fixed washed and dried. The sensitometry was then measured with the following results:

| Example | Speed | B + Fog |
| --- | --- | --- |
| Control - no dye | 107 | 0.13 |
| 1 - Dye #2 of Table 1 | 141 | 0.16 |
| 2 - Dye #3 of Table 1 | 155 | 0.16 |
| 3 - Dye #8 of Table 1 | 128 | 0.13 |

These results indicate that the speed of the emulsion can be greatly improved using the blue spectral sensitizing dyes of this invention. In each case, the other sensitometric results were excellent and images produced using these films had high quality.

We claim:

1. A photographic element comprising a support and at least one, non-tabular silver halide emulsion layer coated thereon, the improvement comprising adding at least one blue spectral sensitizing dye of the following structure:

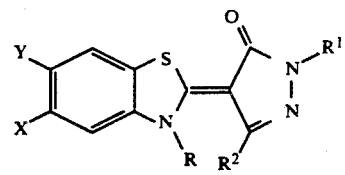

wherein
X and Y independently of the other are halogen, —O—CH$_3$, carboxy or H;
R is alkylcarboxy, sulfopropyl, or sulfobutyl;
R$^1$ is phenyl, H, sulfophenyl, carboxyphenyl, a substituted aromatic or alkyl; and
R$^2$ is carboxy or alkyl, wherein each alkyl independently of the other contains 1-5 carbon atoms.

2. The element of claim 1 wherein said dye is added to a silver halide emulsion in an amount of 50 mg to 800 mg per 1.5 moles of silver halide present in said emulsion.

3. The element of claim 1 wherein said emulsion is coated on both sides of a film support.

4. The element of claim 1 wherein said dye is

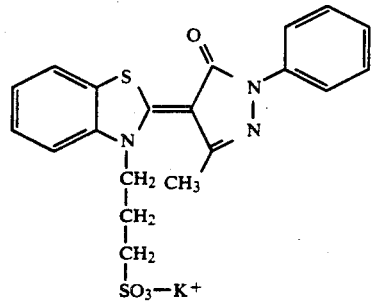

5. The element of claim 1 wherein said dye is selected from the group conprising 4-[3-(3'-sulfopropyl)benzothiazolinylidene]-3-methylpyrazolin-5-one, potassium salt, 4-[3-(3'-sulfopropyl)benzothiazolinylidene]-3-methyl-1-phenylpyrazolin-5-one, potassium salt, 4-[5-chloro-3-(3'-sulfopropyl)-benzothiazolinylidene]-3-methyl-1-phenylpyrazolin-5-one, potassium salt.

* * * * *